United States Patent Office 3,509,039
Patented Apr. 28, 1970

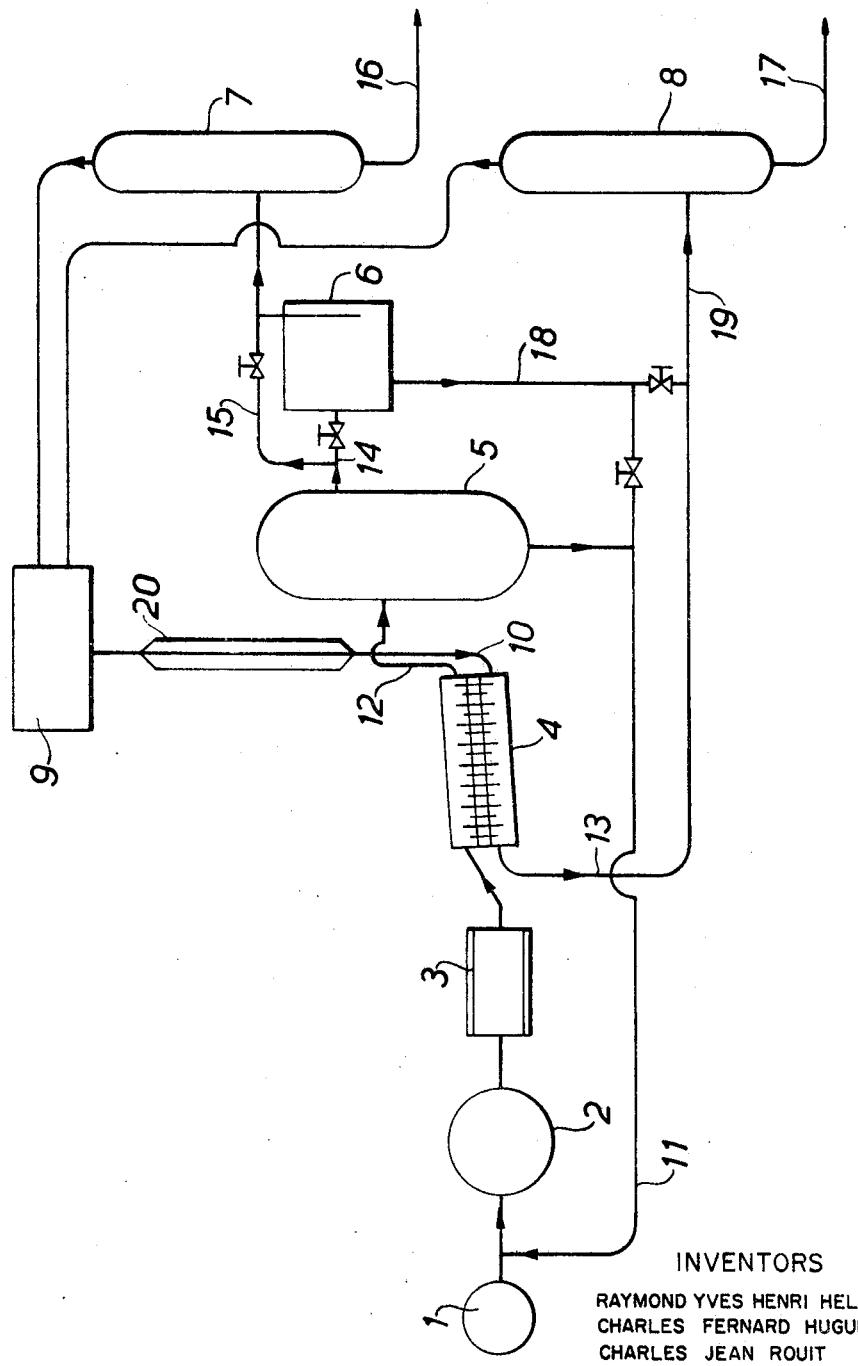

3,509,039
PROCESS FOR DEOILING SLACK WAX
Raymond Yves Henri Helion, Malo-les-Bains, Charles Fernand Hugue, Rosendael, and Charles Jean Rouit, Versailles, France, assignors to The British Petroleum Company Limited, London, England, a corporation of England
Filed Jan. 24, 1968, Ser. No. 700,159
Claims priority, application France, Jan. 31, 1967, 93,248
Int. Cl. C10g 43/08
U.S. Cl. 208—31                                    9 Claims

ABSTRACT OF THE DISCLOSURE

Slack wax is dispersed in a selective solvent for oil and contacted countercurrently with a further quantity of the same solvent. Oil in the slack wax is transferred to the counter current solvent and deoiled slack wax is recovered from the dispersion. There is preferably thorough mixing during contacting using a horizontal contactor with rotating paddles. The dispersed wax phase is preferably the upper phase in the horizontal contactor.

Known selective solvents may be used in amounts of from 150–500 v./v. of wax for the dispersion and from 200–800 v./v. of wax for the counter-current solvent. The temperature of contacting may be from 0–40° C. and the residence time in the contacter from ½–2 hours.

---

The present invention relates to the removal of oil from slack waxes particularly from crystalline slack waxes derived from the dewaxing of petroleum oils.

The distillate lubricating fractions of crude oil contain waxes which are extracted by known processes. The old processes of pressing and centrifuging have now been replaced by processes of de-waxing by solvents, such as an acetone/benzene mixture, trichloroethylene, propane, or an alkyl ketone/benzene (or toluene) mixture.

The slack wax which is obtained by these processes still contains oil in considerable amount which may range up to 35% wt.

This oil and possibly "soft" waxes with a low melting point must be removed from the slack wax so as to obtain pure crystalline waxes with a high melting point. Similarly when residues are dewaxed microcrystalline waxes with an isoparaffinic character are obtained. These also contain oil which it is necessary to remove in order to obtain commercial waxes. In the old processes of pressing slack waxes were deoiled by sweating. Sweating was not, however, suitable for de-oiling micro-crystalline waxes. These latter were diluted in naphtha, cooled and centrifuged.

Solvent deoiling has now replaced these processes. It involves re-dissolving the slack wax in a solvent, cooling to the temperature necessary to give a wax of the desired melting point and then filtering. The wax filter cake is finally washed with further solvent. In this way waxes having oil contents of less than 1% can be obtained. In such a process one generally uses the same solvent as that used for the de-waxing. This process of recrystallisation of slack wax necessitates the use of filters identical with those employed for de-waxing and also the use of a considerable quantity of solvent.

A process has now been discovered which makes it possible to deoil slack wax under more economical conditions and with better results than with the known processes.

According to the present invention a slack wax deoiling process comprises dispersing the wax in a selective solvent for oil, counter currently contacting the dispersion with a further quantity of the same selective solvent, recovering the dispersion containing wax of reduced oil content and separating the wax from the solvent.

Preferably the solvent used is a chlorinated hydrocarbon having from 1 to 4 carbon atoms for example dichlorethane. These solvents have a high density of at least 1 (as compared with a density of 0.8–0.9 for slack waxes generally) so that the dispersion of wax in the solvent has an appreciably different overall density from the further quantity of solvent. This helps in keeping the two counter-current phases distinct. However, other solvents can be used even when they are of similar density to the wax. Thus an alkyl ketone solvent may be used, particularly methyl ethyl ketone and/or methyl isobutyl ketone if necessary mixed with an aromatic hydrocarbon such as benzene or toluene. Also, solvents of lower density than the wax can be used, for example n-paraffin hydrocarbons having from 3–10 carbon atoms, particularly n-hexane or n-heptane.

The amount of solvent used to form the dispersion may be from 150 to 500% volume by volume of the wax and the amount of counter-current solvent from 200 to 800% volume by volume of the wax. The amounts are kept as low as possible for economic and practical reasons and preferred amounts are 150–400% volume for the dispersion and 200–500% volume for the counter-current solvent.

Although the dispersion and the further quantity of counter-current solvent are fed to and recovered from the process separately, there is desirably positive mixing of the phases during the contacting. Preferably the contacting is carried out in a horizontal or near horizontal contacter with the two phases one above the other and with rotating paddles carrying the lower phase into the upper phase and vice versa. The dispersion preferably forms the upper phase.

One suitable type of contacter is the Graesser contacter such as is described in U.K. patent specifications Nos. 972,035 and 1,037,573.

The temperature of contacting may be from 0 to 40° C., preferably 0–20° C. and the residence time in the contactor may be from 30 minutes to 2 hours.

The separation of the dispersion after the contacting into a solid wax phase and a liquid solvent phase can be achieved simply by settling. The wax phase will contain a small amount of entrained solvent which can be removed by stripping with nitrogen or steam and reused. The liquid solvent phase separated from the wax will contain oil as will the counter-current solvent phase and these may be distilled, separately or together, to recover the solvent for re-use.

The preferred wax feedstocks are crystalline slack waxes, but micro-crystalline slack waxes (sometimes called bright-stock slack waxes) may also be deoiled by the present process.

The present invention produces waxes of acceptable oil content of not more than 1% wt. For certain qualities of crystalline waxes oil contents of less than 0.1% wt. are possible.

The process is also economical in that it needs a total volume of solvent less than that used in the known processes of deoiling by recrystallisation.

The simplicity of the process is an advantage; in particular it does not require the use of rotary filters as used in modern dewaxing units. These are very complex appliances which have high capital and running costs.

The invention is illustrated in the accompanying drawing which shows, in diagrammatic form, an installation suitable for carrying out the process of the invention.

In the drawing, slack wax coming from the supply tank 1 is sent to the mixing tank 2 containing solvent coming from the settler 5 and possibly from the drier 6 through the pipe 11. In the mixing tank 2 the slack wax is dispersed in the solvent by means of an agitator and then the mixture is sent to the contacter 4 after being cooled in the cooler 3.

The contacter consists of a cylindrical chamber which is nearly horizontal having a central shaft which is rotated at a relatively slow speed. The speed of rotation depends on the size of the contacter but may be from ½ to 30 r.p.m. Mounted on the shaft are discs having a number of buckets, the diameter of the discs being slightly less than the internal diameter of the chamber. The dispersion of wax in solvent is fed to the top left hand end of the contacter and emerges through line 12 at the top right hand end. Flowing counter-current to the dispersion is a further quality of solvent entering at the bottom right hand through line 10 and leaving at the bottom left hand through line 13. The two phases completely fill the contacter with the interface along the centre of the chamber. As the discs rotate, the buckets on them carry part of the lower solvent phase into the upper dispersion and discharge it into the dispersion as they become inverted. Similarly as the buckets move down through the dispersion they carry dispersion into the lower solvent phase thereby mixing the two phases. The phases travel horizontally along the contacter through the annular gaps between the circumference of the discs and the internal surface of the cylinder.

Thus two phases are withdrawn from the contacter: a wax/solvent dispersion, the solvent of which contains a little oil, and a solvent phase containing dissolved oil.

The wax/solvent dispersion leaving the contacter 4 through the pipe 12 is sent to the settler 5, where two phases separate out: a wax phase containing entrained solvent and a solvent phase containing a small quantity of oil.

The wax phase leaves the settler 5 through the line 14 and is dried in the drier 6 before being finally freed from solvent in the stripper 7. The deoiled wax product is discharged through the pipe 16.

The drying stage may be dispensed with if desired. In this case the wax phase leaves the settler 5 through the line 15 and is fed direct to the stripper 7.

The solvent/oil solution leaving the container 4 is sent to the distillation column 8 through pipe 13. Oil, freed from solvent, leaves at the bottom of the column 8 through pipe 17. The solvent leaving the column 8 is sent with the solvent leaving the stripper 7 to the solvent tank 9, from which it is recycled to the contacter 4 after passing through the cooler 20.

The solvent phase leaving the settler 5 is sent through the pipe 11 to the mixing tank 2. The solvent leaving the drier 6, according to its oil content, is sent either to the mixing tank 2 through pipes 18 and 11 or to the distillation column 8 through pipes 18 and 19.

The invention is further illustrated by the following examples.

Example 1

Three crystalline slack waxes were deoiled using a near horizontal contacter as described with reference to the drawing. The solvent used in both phases was dichlorethane with a density at 20° C./4° C. of 1.2569 and a boiling point of 83.5° C. The density of the waxes being deoiled ranged between 0.809 and 0.875.

The conditions used and results are set out in Table 1 below:

TABLE 1

| Raw materials | Crystalline wax with a melting point of 48-50 °C. | Crystalline wax with a melting point of 56-58 °C. | Crystalline wax with a melting point of 60-62 °C. |
| --- | --- | --- | --- |
| Oil content of raw materials (method NF T60-120). | 9% by wt | 17% by wt | 6% by wt. |
| Residence time in contacter | 60 minutes | 60 minutes | 60 minutes. |
| Temperature of treatment | 10° C | 10° C | 10° C. |
| Quantity of solvent in the dispersion. | 250% by vol | 250% by vol | 400% by vol. |
| Quantity of countercurrent solvent | 400% by vol | 400% by vol | 400% by vol. |
| Oil content of deoiled wax | 0.25% by wt | 0.3% by wt | 0.1% by wt. |
| Yield of deoiled wax | 72.4% by wt | 67% by wt | 83.4% by wt. |
| Melting point of deoiled wax | 48.7° C | 57.7° C | 61° C. |

Example 2

Example 1 was repeated with a crystalline wax of 54–56° C. melting point using different solvents from the dichlorethane of Example 1. The solvents were:

(i) a mixture of 85% methyl isobutyl ketone and 15% methyl ethyl ketone (density at 20° C./4° C.=0.805)
(ii) n-hexane (density at 20° C./4° C.=0.672, boiling point 69° C.)
(iii) n-heptane (density at 20° C./4° C.=0.688, boiling point 98° C.)

The conditions used and results obtained are given in Table 2 below.

TABLE 2

| Solvent | MiBK/MEK | Hexane | Heptane |
| --- | --- | --- | --- |
| Oil content of raw material, wt. percent | 16.2 | 16.2 | 16.2 |
| Temperature of treatment, ° C | 10 | 10 | 10 |
| Quantity of solvent in the dispersion, percent v | 430 | 400 | 400 |
| Quantity of counter-current solvent, percent v | 600 | 800 | 800 |
| Residence time in contacter, minutes | 60 | 60 | 60 |
| Oil content of wax, wt. percent | 0.3 | 0.75 | 0.45 |
| Melting point of deoiled wax, ° C | 56 | 54 | 54.5 |

We claim:
1. A process for deoiling slack wax comprising forming a dispersion of slack wax in solvent by mixing a slack wax to be deoiled with a selective solvent for oil under agitation, feeding said dispersion to the upper half of a horizontal or near horizontal contacter, feeding a further quantity of the same selective solvent to the lower half of said contacter as a counter-current solvent, counter currently contacting the dispersion in said contacter with said counter-current solvent with the dispersion and counter-current solvent one above the other and with rotating paddles carrying the lower phase into the upper phase and vice versa, recovering the dispersion containing wax of reduced oil content and separating the wax from the solvent.

2. A process as claimed in claim 1 wherein the slack wax is a crystalline slack wax.

3. A process as claimed in claim 1 wherein the selective solvent is a chlorinated hydrocarbon having from 1 to 4 carbon atoms.

4. A process as claimed in claim 1 wherein the selective solvent is an alkyl ketone or mixture of ketones.

5. A process as claimed in claim 1 wherein the selective solvent is a n-paraffin having from 3 to 10 carbon atoms.

6. A process as claimed in claim 1 wherein the amount of solvent used to form the dispersion is from 150 to 500% volume by volume of the wax and the amount of counter-current solvent is from 200 to 800% volume by volume of the wax.

7. A process as claimed in claim 6 wherein the amount of solvent in the dispersion is from 150–400% vol. and the amount of counter-current solvent is from 200–500% volume.

8. A process as claimed in claim 1 wherein the temperature of contacting is from 0 to 40° C.

9. A process as claimed in claim 8 wherein the temperature is from 0 to 20° C.

References Cited

UNITED STATES PATENTS

| | | | |
|---|---|---|---|
| 2,361,503 | 10/1944 | Schutee et al. | 196—14.5 |
| 2,370,453 | 2/1945 | Dons et al. | 208—33 |
| 2,595,468 | 5/1952 | Kiersted et al. | 208—31 |

HERBERT LEVINE, Primary Examiner

U.S. Cl. X.R.

208—29; 196—14.5